Feb. 26, 1929.
J. W. BROWN, JR
MEAT CUTTER KNIFE
Filed Sept. 10, 1924
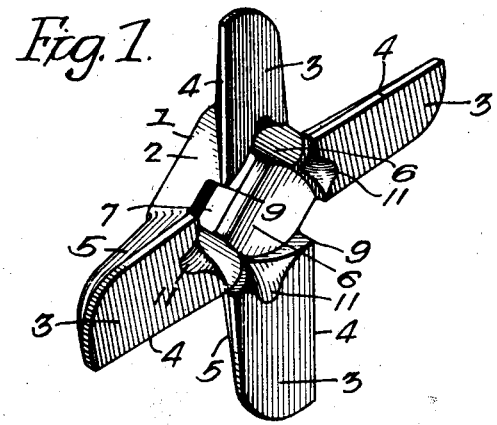
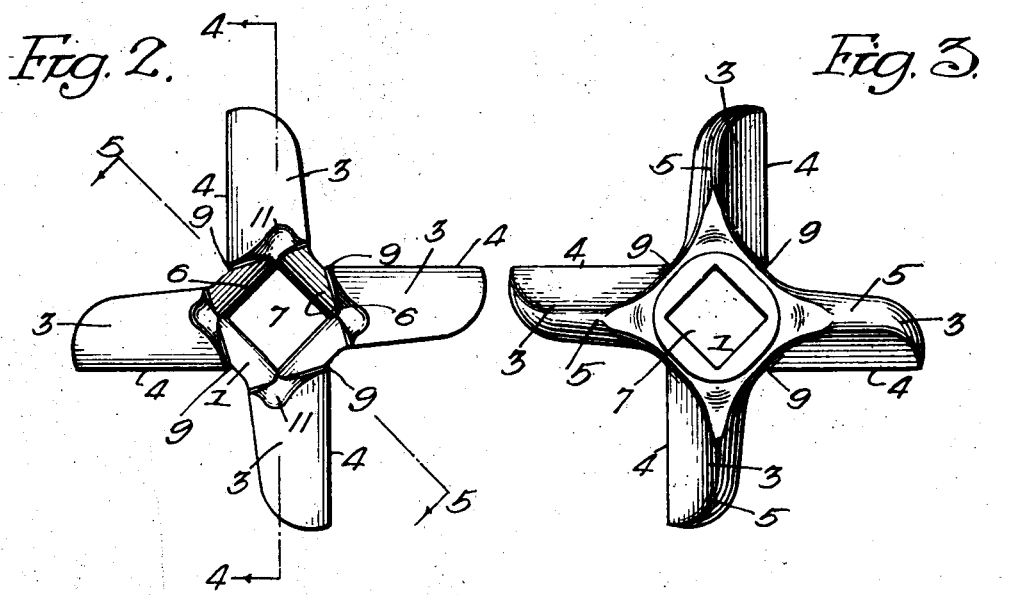
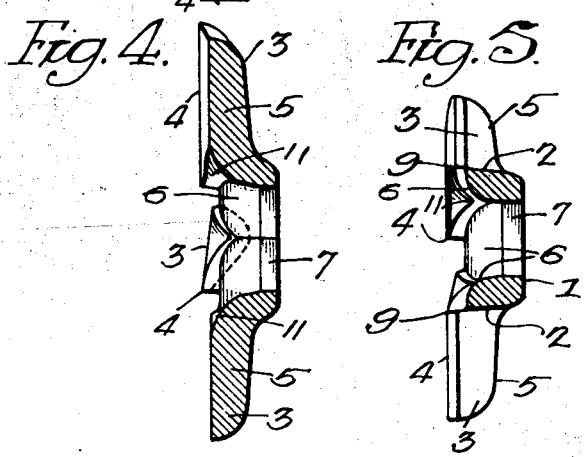
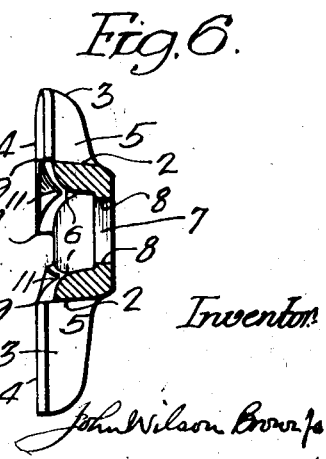

Patented Feb. 26, 1929.

1,703,762

UNITED STATES PATENT OFFICE.

JOHN WILSON BROWN, JR., OF PHILADELPHIA, PENNSYLVANIA, ASSIGNOR TO ENTERPRISE MANUFACTURING COMPANY OF PENNSYLVANIA, OF PHILADELPHIA, PENNSYLVANIA, A CORPORATION OF PENNSYLVANIA.

MEAT-CUTTER KNIFE.

Application filed September 10, 1924. Serial No. 736,999.

My invention relates to certain improvements in the knife of a meat cutter of the type in which the knife is rotated against a perforated plate in order to cut the material as it is forced into the openings in the plate.

Heretofore the general practice has been to make the knife of a meat cutter of this type comparatively heavy and of cast metal.

One object of the invention is to form a knife from a body of metal by die forging, the metal being preferably steel.

A further object of the invention is to provide a knife that will rock easily on the stud that projects from the feed screw of a meat cutter so that it will accommodate itself to the surface of the perforated plate.

A still further object of the invention is to design the knife so that it can be formed readily between suitable dies.

By my invention the knife can be made much lighter than heretofore, yet the strength of the knife is materially increased. As the blades of the knife are comparatively light, they pass much more readily through the material being cut than the blade of an ordinary cast metal knife.

In the accompanying drawings:—

Fig. 1 is a perspective view of a meat cutter knife made in accordance with my invention;

Fig. 2 is a view of the front face of the knife;

Fig. 3 is a view of the rear of the knife;

Fig. 4 is a sectional view on the line 4—4, Fig. 2;

Fig. 5 is a sectional view on the line 5—5, Fig. 2; and

Fig. 6 is a view illustrating a modification of the invention.

The knife has a hub section 1. In the present instance there are four blades that project from the hub, although the number of blades may be varied. The outer surface 2 of the hub is tapered, as shown clearly in Fig. 5, and the bore of the hub has tapered walls 6, which are rounded at the forward end and terminate in a straight bearing portion 7. This portion 7 conforms to the shape of the stud that projects from the feed screw of a meat cutter. In the present instance, the portion 7 is rectangular so as to fit a rectangular stud. The blades 3 have cutting edges 4 and are tapered towards the back to form a reinforcing rib 5. By making the knife of forged steel, the thickness of the blades can be materially decreased so that it will pass readily through a mass of material, which is forced against the cutting blade. The front surface of each blade is bevelled slightly to insure the bearing of the cutting edge against the perforated plate.

On referring to Fig. 5, it will be noticed that the cutting edge 4 at the inner end terminates on a line with the surface of the hub. This construction is desirable for the purpose of manufacture and is important. The hub is notched as at 9, in the front of the cutting edge of each blade, which allows clearance and defines the blade.

By making the opening in the hub of the knife straight at the rear, a comparatively neat fit and a substantial bearing surface against the stud are assured. By flaring the opening in the hub towards the cutting face of the knife, the knife readily accommodates itself to the perforated plate. This construction also simplifies the process of manufacture. It will be noticed that each blade is depressed at the point where it joins the hub, as indicated at 11 Figs. 2 and 4. By reason of this depression the knife can be made from thinner material than would otherwise be possible.

In. Fig. 5, the taper of the opening in the knife begins on a line with the straight portion 7.

In Fig. 6, the straight portion is formed on an inner flange 8. This construction increases the clearance between the tapered portion of the hub and the stud on which the knife is mounted.

By making the knife as hereinbefore described, it can be easily and accurately forged from high grade steel, the cost of production being comparatively low.

I claim:

1. A meat cutter knife having a hub tapered on the outside and having a series of blades radiating from said hub, each blade having a cutting edge and being thickened at the back, the opening in the hub having a polygonal straight bearing portion at the rear to receive the stud projecting from a feed screw, the opening in the said hub being tapered outwards from the straight portion, the extreme end of the opening being curved and merging into the face of the hub.

2. A meat cutter knife having a hub tapered at its periphery and having a series of radiating blades, the cutting edge of each blade terminating on a line with the surface of the hub, said hub having a polygonal opening for the reception of the stud on which it is mounted, the walls of said opening being parallel at the rear to fit the stud, the remainder of the opening being tapered to allow the blade to accommodate itself to the perforated plate, each blade having a depression in its face where it joins the hub.

3. A die forged meat cutting knife of steel, consisting of a pyramidal hub having a pyramidal central opening, both the hub and the opening being smallest at the end furthest from the cutting face of the knife; and blades radiating from the hub, the inner end of the cutting edge of each blade terminating on a line with the surface of the hub.

JOHN WILSON BROWN, Jr.